US010471414B2

(12) United States Patent
Avenier et al.

(10) Patent No.: US 10,471,414 B2
(45) Date of Patent: Nov. 12, 2019

(54) MULTI-METALLIC CATALYST DOPED WITH PHOSPHORUS AND A LANTHANIDE

(71) Applicant: IFP Energies nouvelles, Rueil-Malmaison (FR)

(72) Inventors: Priscilla Avenier, Grenoble (FR); Fabrice Diehl, Lyons (FR); Carine Guegan, Decines Charpieu (FR); Eric Sanchez, Saint Genis Laval (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 15/747,341

(22) PCT Filed: Jul. 6, 2016

(86) PCT No.: PCT/EP2016/065970
§ 371 (c)(1),
(2) Date: Jan. 24, 2018

(87) PCT Pub. No.: WO2017/016832
PCT Pub. Date: Feb. 2, 2017

(65) Prior Publication Data
US 2019/0015819 A1    Jan. 17, 2019

(30) Foreign Application Priority Data

Jul. 24, 2015    (FR) .................................... 15 57055

(51) Int. Cl.
*B01J 21/08*    (2006.01)
*B01J 21/12*    (2006.01)
(Continued)

(52) U.S. Cl.
CPC ............... *B01J 23/63* (2013.01); *B01J 21/04* (2013.01); *B01J 27/1856* (2013.01);
(Continued)

(58) Field of Classification Search
CPC ... B01J 21/08; B01J 21/12; B01J 23/42; B01J 23/44; B01J 23/626; B01J 23/63;
(Continued)

(56) References Cited

U.S. PATENT DOCUMENTS 3,915,845 A     10/1975   Antos
3,993,598 A  *  11/1976   Arey, Jr. .................. B01J 23/74
                                                502/303

(Continued)

FOREIGN PATENT DOCUMENTS

FR           2947465 A1    1/2011

OTHER PUBLICATIONS

International Search Report PCT/EP2016/065970 dated Sep. 15, 2016.

*Primary Examiner* — Patricia L. Hailey
(74) *Attorney, Agent, or Firm* — Millen, White, Zelano and Branigan, P.C.

(57) ABSTRACT

The invention relates to a catalyst comprising a support, at least one noble metal M, tin, phosphorus and at least one lanthanide group element, the content of phosphorus element being comprised between 0.4 and 1% by weight, and the content of lanthanide group element(s) being less than 1% by weight with respect to the weight of the catalyst. The invention also relates to the process for the preparation of the catalyst and the use thereof in reforming.

20 Claims, 1 Drawing Sheet

(51) Int. Cl.
*B01J 23/42* (2006.01)
*B01J 23/44* (2006.01)
*B01J 37/08* (2006.01)
*B01J 37/14* (2006.01)
*B01J 37/18* (2006.01)
*B01J 23/63* (2006.01)
*B01J 27/185* (2006.01)
*C10G 35/09* (2006.01)
*B01J 21/04* (2006.01)
*B01J 37/00* (2006.01)
*B01J 37/02* (2006.01)
*B01J 23/83* (2006.01)

(52) U.S. Cl.
CPC ....... *B01J 37/0072* (2013.01); *B01J 37/0201* (2013.01); *C10G 35/09* (2013.01); *B01J 23/83* (2013.01); *B01J 2523/00* (2013.01); *B01J 2523/31* (2013.01); *B01J 2523/3712* (2013.01); *B01J 2523/43* (2013.01); *B01J 2523/51* (2013.01); *B01J 2523/828* (2013.01)

(58) Field of Classification Search
CPC ........ B01J 27/1856; B01J 37/08; B01J 37/14; B01J 37/18; B01J 2523/31; B01J 2523/3712; B01J 2523/43; B01J 2523/51; B01J 2523/828; C10G 35/09

USPC ....... 502/208, 213, 302, 339, 352, 224, 242, 502/262, 263; 208/138, 139
See application file for complete search history.

(56) References Cited

U.S. PATENT DOCUMENTS

| | | |
|---|---|---|
| 4,367,137 A | 1/1983 | Antos |
| 5,922,639 A * | 7/1999 | Alario ............... B01J 23/56 502/224 |
| 2002/0022755 A1* | 2/2002 | Dongara ............. B01J 23/8966 585/661 |
| 2002/0155946 A1 | 10/2002 | Bogdan |
| 2003/0032552 A1* | 2/2003 | Zoeller ................ B01J 23/626 502/150 |
| 2004/0011702 A1 | 1/2004 | Ma |
| 2006/0102520 A1* | 5/2006 | Lapinski ............. B01J 23/626 208/138 |
| 2007/0215523 A1 | 9/2007 | Moser |
| 2009/0114568 A1* | 5/2009 | Trevino ................ B01J 23/40 208/139 |
| 2010/0216630 A1* | 8/2010 | Gajda .................. B01J 23/62 502/73 |
| 2011/0230337 A1* | 9/2011 | Ji ....................... B01D 53/864 502/304 |
| 2014/0200384 A1* | 7/2014 | Kauffman ............ B01J 37/08 585/660 |
| 2017/0252726 A1 | 9/2017 | Avenier |

* cited by examiner

MULTI-METALLIC CATALYST DOPED WITH PHOSPHORUS AND A LANTHANIDE

The present invention relates to the field of conversion of hydrocarbons and more specifically the reforming of hydrocarbon-containing feedstocks in the presence of a catalyst for the production of gasoline cuts and aromatic compounds. More particularly, the invention relates to an improved catalyst based on at least one noble metal, tin, phosphorus and a lanthanide, the process for the preparation thereof and the use thereof in a reforming process.

Catalytic reforming processes make it possible to increase significantly the octane number of gasoline fractions originating from the direct distillation of crude oil and/or from other refining processes such as catalytic cracking or thermal cracking for example. The catalytic reforming process is used very widely by refiners for upgrading heavy gasoline obtained by distillation. The hydrocarbons of the heavy gasoline feedstock (in particular paraffins and naphthenes) containing approximately 5 to 12 carbon atoms per molecule are transformed during this process to aromatic hydrocarbons and branched paraffins. This transformation is obtained at high temperature (on average in the range 480 to 520° C.), at low to moderate pressure (0.2 to 2.5 MPa) and in the presence of a catalyst. Catalytic reforming produces reformate, which makes it possible to improve the octane number of the petroleum cuts significantly, and hydrogen. The reformate consists mainly of C5+ compounds (containing at least 5 carbon atoms).

The reforming catalysts are multi-metallic catalysts. There are two main categories of reforming catalysts, which have different properties: the platinum-tin catalysts generally used in the form of beads in a moving-bed reactor in processes called CCR (for Continuous Catalytic Reforming) and the platinum-rhenium catalysts generally used in the form of extrudates in fixed beds.

For these two types of catalysts, numerous patents describe the addition of promoters in order to improve their performance in the reforming of hydrocarbon-containing feedstocks.

As regards doping with lanthanides, and in particular cerium, U.S. Pat. No. 2,814,599 describes the addition of promoters such as gallium, indium, scandium, yttrium, lanthanum, thallium or actinium, to catalysts based on platinum or palladium. Document US2013/0015103 describes catalysts with Ce (PtSnCe). Document US2013/0256194 describes this same type of catalysts in combination with alkaline compounds at very low content. Document EP1390140 describes catalysts doped with Ce and/or Eu. Documents CN103372454 or U.S. Pat. No. 6,239,063 describe catalysts comprising other lanthanides in addition to Ce on one and the same catalyst.

Moreover, phosphorus is known to increase the yields of hydrocarbon-containing compounds with strictly more than 4 carbon atoms (C5+) and aromatic products in particular. This property is claimed in U.S. Pat. Nos. 2,890,167, 3,706, 815, 4,367,137, 4,416,804, 4,426,279 and 4,463,104. Document US2012/122665 describes a catalyst comprising platinum, tin, phosphorus and at least one promoter selected from the group constituted by gallium, indium, thallium, arsenic, antimony and bismuth.

Document EP1656991 describes a catalyst comprising platinum and tin having a Pt/Sn ratio less than 0.9, and optionally another element selected from germanium, gallium, cerium, lanthanum, europium, indium, phosphorus, nickel, iron, tungsten, molybdenum, zinc or cadmium, alone or in a mixture with an elemental content between 0.1 and 10% by weight with respect to the weight of the catalyst, but without linking a particular effect to the promoters.

It is also described in document US2007/0215523 that the addition of diluted quantities of phosphorus, less than 0.4% by weight, stabilizes the support, allowing better retention of specific surface area and of chlorine when it is used in catalytic reforming processes. This document discloses a catalyst based on platinum and phosphorus optionally comprising another element selected from tin, rhenium, germanium, lead, indium, gallium, iridium, lanthanum, cerium, boron, cobalt, nickel and iron, alone or in a mixture with an elemental content between 0.01 and 5% by weight with respect to the weight of the catalyst.

In this context, one of the objectives of the present invention is to propose a catalyst having improved selectivity and stability in a reforming process without deterioration of activity.

By selectivity is meant the yield of C5+ compounds expressed as percentage by weight relative to the effluent at a given activity level (typically at a given level of octane number).

Activity is generally characterized as the given octane number of the C5+ compounds at a level of severity or on the contrary is expressed by a temperature required to reach a given octane number (also called RON or Research Octane Number).

By stability is meant the stability of the activity, which is generally measured by the thermal increment applied in operation in the unit per unit time or unit feed for maintaining performance at a given octane number.

The invention relates to a catalyst comprising a support, at least one noble metal M, tin, phosphorus and at least one lanthanide group element, the content of phosphorus element being comprised between 0.4 and 1% by weight, and the content of lanthanide group element(s) being less than 1% by weight with respect to the weight of the catalyst.

It has been shown that the simultaneous presence of a phosphorus promoter and at least one lanthanide group element, and in particular cerium, each promoter being present in a certain quantity on a catalyst based on a noble metal and tin, endows the final catalyst with selectivity and stability far superior to the catalysts of the state of the art only containing one of these promoters or to the catalysts of the state of the art containing the two promoters in an insufficient or an excessive quantity. Without being bound by any theory, it appears that the simultaneous presence of a quantity of a phosphorus promoter comprised between 0.4 and 1% by weight and a quantity of at least one lanthanide group element less than 1% by weight with respect to the weight of the catalyst shows, surprisingly, a synergistic effect for the improvement of selectivity and stability without this synergistic effect being foreseeable by the simple addition of the known improvement effects of the promoters.

According to a variant, the content of noble metal M is comprised between 0.02 and 2% by weight with respect to the weight of the catalyst.

According to a variant, the metal M is platinum or palladium.

According to a variant, the content of the element tin is comprised between 0.005 and 10% by weight with respect to the weight of the catalyst.

According to a variant, the content of lanthanide group element is comprised between 0.01 and 0.5% by weight with respect to the weight of the catalyst.

According to a variant, the lanthanide group element is cerium.

According to a variant, the Sn/M atomic ratio is comprised between 0.5 and 4.0, the P/M ratio is comprised between 0.2 and 30.0, and the lanthanide(s)/M ratio is comprised between 0.1 and 5.0.

According to a variant, the support comprises silica, alumina or silica-alumina.

According to a variant, the catalyst additionally contains a halogenated compound.

According to this variant, the content of halogenated compound is comprised between 0.1 and 8% by weight with respect to the weight of the catalyst.

The invention also relates to a process for the preparation of a catalyst according to the invention comprising the following successive stages:
   a) preparing a support comprising tin, phosphorus and a noble metal,
   b) drying the precursor obtained in stage a) under a flow of a neutral gas or under a flow of a gas containing oxygen at a temperature less than 200° C., and calcining at a temperature comprised between 350 and 650° C.,
   c) impregnating the dried and calcined precursor obtained in stage b) with an impregnation solution comprising a precursor of at least one lanthanide group element,
   d) drying the precursor obtained in stage c) under a flow of a neutral gas or under a flow of a gas containing oxygen at a temperature less than 200° C., and calcining at a temperature comprised between 350 and 650° C.

According to a variant, stage a) comprises the following stages:
   a1) preparing a support comprising tin by introducing the tin precursor during forming of the support,
   a2) impregnating the tin-containing support obtained in stage a1) with an impregnation solution comprising at least one precursor of a noble metal and a phosphorus precursor.

According to another variant, stage a) comprises the following stages:
   a1') preparing a support comprising tin and phosphorus by introducing the tin precursor and the phosphorus precursor during forming of the support,
   a2') impregnating the support containing tin and phosphorus obtained in stage a1') with an impregnation solution comprising at least one precursor of a noble metal.

According to another variant, the catalyst obtained after stage d) is subjected to a treatment under hydrogen.

The invention also relates to the use of the catalyst according to the invention or prepared according to the preparation process in a reforming process.

Hereinafter, the groups of chemical elements are given according to the CAS classification (CRC Handbook of Chemistry and Physics, publisher CRC Press, chief editor D. R. Lide, 81$^{st}$ edition, 2000-2001). For example, group VIII according to the CAS classification corresponds to the metals of columns 8, 9 and 10 according to the new IUPAC classification.

All the contents of the various components of the catalyst, and in particular the contents of noble metal, tin, phosphorus, lanthanide group element and halogenated compound, are expressed relative to the element, unless explicitly stated otherwise.

DETAILED DESCRIPTION OF THE INVENTION

Catalyst

The invention relates to a catalyst comprising a support, at least one noble metal M, tin, phosphorus and at least one lanthanide group element, the content of phosphorus element being comprised between 0.4 and 1% by weight, and the content of lanthanide group element(s) being less than 1% by weight with respect to the weight of the catalyst.

The support generally comprises at least one oxide selected from the group constituted by the oxides of magnesium, of titanium, of zirconium, of aluminium, and of silicon. Preferably, the support comprises silica, alumina or silica-alumina, and very preferably alumina. Preferably, the support comprises alumina, and preferably the alumina is gamma alumina.

The support advantageously has a total pore volume comprised between 0.1 and 1.5 cm$^3$/g, more preferably comprised between 0.4 and 0.8 cm$^3$/g. The total pore volume is measured by mercury porosimetry according to standard ASTM D4284 with a wetting angle of 140°, as described in the work by Rouquerol F., Rouquerol J., Singh K. "Adsorption by Powders & Porous Solids: Principle, methodology and applications", Academic Press, 1999, for example using model Autopore III™ equipment made by Micromeritics™.

The specific surface area of the alumina support is advantageously comprised between 50 and 600 m$^2$·g$^{-1}$, preferably between 100 and 400 m$^2$·g$^{-1}$, more preferably between 150 and 300 m$^2$·g$^{-1}$. The specific surface area is determined in the present invention by the BET method according to standard ASTM D3663; this method is described in the same work cited above.

Advantageously, the support has a value of tapped bulk density (TBD) between 0.4 and 0.8 g/mL, preferably between 0.5 and 0.7 g/mL. Measurement of TBD consists of introducing the support into a test tube (typically with a volume of 100 mL), the volume of which has been determined beforehand, then, by vibration, settling until a constant volume is obtained. The apparent density of the settled product is calculated by comparing the mass introduced and the volume occupied after settling. The uncertainty of measurement is generally of the order of ±0.01 g/mL.

Thus, the support, when used as support for a reforming catalyst, makes it possible to meet the requirements for a so-called dense support (e.g. tapped bulk density of around 0.6 to 0.7 g/mL) as well as the requirements for a so-called lightweight support (e.g. tapped bulk density around 0.5 to 0.6 g/mL).

Preferably, the value of tapped bulk density (TBD) of said support is comprised between 0.5 and 0.7 g/mL.

The support is advantageously in the form of beads, extrudates, pellets or powder. Preferably, the support is in the form of beads. The support may be obtained by any technique known to a person skilled in the art. Forming may be carried out for example by extrusion, by pelletization, by the oil-drop method, by granulation with a rotating plate or by any other method familiar to a person skilled in the art.

When the support is in the form of beads, its diameter is generally between 0.5 and 5 mm. Such a bead can be manufactured by the oil-drop method. According to this method and when the support is an alumina, a suspension is prepared containing an alumina gel (such as boehmite (crystallized aluminium oxyhydroxide) or pseudoboehmite), an emulsifier, optionally metallic precursors and water, and the suspension is transferred to a dropping pot equipped with nozzles the orifices of which are calibrated to form drops. Then drops of the suspension are formed by gravity in a column containing an organic phase in the upper part (petroleum phase) and a basic aqueous phase (ammonia solution) in the lower part so as to collect the spheroidal particles at the bottom of the basic aqueous phase. It is during passage of the drop through the organic phase that forming of the beads takes place, whereas gelation (or coagulation) takes place in the aqueous phase. The beads are then dried and calcined.

When the support is in the form of extrudates, the latter may be prepared by mixing an alumina gel with water and suitable peptizing agents, such as hydrochloric or nitric acid, optionally in the presence of metallic precursors, until an extrudable paste has formed (shearing acid mixing). The paste obtained may be extruded through a die of suitable size to form extrudates, which are then dried and calcined. Prior to extrusion it may sometimes be necessary to add a pH neutralizing agent such as ammonia solution. In general, the diameter of the extrudates is comprised between 0.5 and 5 mm, preferably with a length-to-diameter ratio from 1:1 to 5:1.

An essential component of the catalyst according to the invention is a noble metal M, preferably platinum or palladium, very preferably platinum. This noble metal may be present in the final catalyst as an oxide, sulphide, halide, oxyhalide, in chemical combination with one or more of the other components of the catalyst or in the form of elemental metal.

The content of noble metal M in the catalyst according to the invention is between 0.02 and 2% by weight, preferably between 0.05 and 1.5% by weight, even more preferably between 0.1 and 0.8% by weight with respect to the weight of the catalyst.

Another essential component of the catalyst according to the invention is tin. This element may be present in the final catalyst as an oxide, sulphide, halide, oxyhalide, in chemical combination with one or more of the other components of the catalyst or in the form of elemental metal.

The tin content of the catalyst according to the invention is comprised between 0.005 and 10% by weight, more preferably between 0.01 and 5% by weight and very preferably between 0.1 and 1% by weight.

Another essential component of the catalyst according to the invention is phosphorus. This element may be present in the final catalyst as oxide or mixed oxide, phosphates, polyphosphates, sulphide, halide, oxyhalide, hydride or in chemical combination with one or more of the other components of the catalyst.

The content of phosphorus element in the catalyst according to the invention is comprised between 0.4 and 1% by weight and preferably between 0.4 and 0.8% by weight.

Another essential component of the catalyst according to the invention is at least one promoter selected from a lanthanide group element. By lanthanide group is meant the elements of the periodic table having an atomic mass comprised between 57 and 71, and in particular lanthanum, cerium, praseodymium, neodymium, promethium, samarium, europium, gadolinium, terbium, dysprosium, holmium, erbium, thallium, ytterbium and lutetium. Preferably, the lanthanide group element is cerium, lanthanum, neodymium, ytterbium or praseodymium. Particularly preferably, the lanthanide group element is cerium. This lanthanide component may be present in the final catalyst as an oxide, sulphide, halide, oxyhalide, in chemical combination with one or more of the other components of the catalyst or in the form of elemental metal.

The (total) content of one or more lanthanide promoter(s) in the catalyst according to the invention is less than 1% by weight, preferably comprised between 0.01 and 0.5% by weight and particularly preferably between 0.02 and 0.3% by weight with respect to the weight of the catalyst.

The simultaneous presence of a quantity of phosphorus comprised between 0.4 and 1% by weight and a quantity of at least one lanthanide group element less than 1% by weight with respect to the weight of the catalyst shows a synergistic effect that is surprising in particular for the essential functions of the catalyst, namely selectivity and stability, without any deterioration in activity.

The Sn/M atomic ratio is generally comprised between 0.5 and 4.0, more preferably between 1.0 and 3.5, and very preferably between 1.3 and 3.2.

The P/M ratio is generally comprised between 0.2 and 30.0, more preferably between 0.5 and 20.0, and very preferably between 1.0 and 15.0.

The lanthanide(s)/M ratio is generally comprised between 0.1 and 5.0, more preferably between 0.2 and 3.0, and very preferably between 0.4 and 2.2.

The catalyst according to the invention may also preferably comprise a halogenated compound, selected from the group constituted by fluorine, chlorine, bromine and iodine. The content of halogenated compound is generally comprised between 0.1 and 8% by weight, preferably between 0.2 and 3% by weight of catalyst after calcination. Preferably, the halogenated compound is chlorine.

The catalyst according to the invention may also optionally include other promoters selected from groups IA, IIA, IIIA (in particular indium), IVA (in particular germanium), and VA of the periodic table, cobalt, nickel, iron, tungsten, molybdenum, chromium, bismuth, antimony, zinc, cadmium and copper. When these elements are present in the catalyst, the content expressed as oxide is generally comprised between 0.01 to 2% by weight, preferably between 0.05 and 1% by weight with respect to the weight of the catalyst.

However, the catalyst is preferably constituted by a support, at least one noble metal M, tin, phosphorus and at least one promoter selected from a lanthanide group element, and particularly preferably it is constituted by a support, platinum, tin, phosphorus and cerium in the specific quantities of phosphorus and cerium indicated above.

All the elements are preferably distributed uniformly in the support.

Preparation Process for the Catalyst

The catalyst according to the invention may be prepared by any preparation process known to a person skilled in the art.

The noble metal may be incorporated into the support in any suitable way, such as co-precipitation, ion exchange or impregnation. Preferably, it is introduced by impregnation of the previously formed support, for example by impregnation in excess or by dry impregnation (the volume of solution containing the element to be introduced corresponding to the pore volume of the support), and preferably by impregnation in excess. For this, the support is impregnated with an impregnation solution comprising at least the noble metal.

In general, hydrogen chloride or another similar acid may also be added to the impregnation solution for further facilitating the incorporation of the noble metal component or fixation thereof on the surface of the support and uniform distribution of the metallic components in the whole of the support material.

Moreover, it is generally preferable to impregnate the support after it has been calcined, in order to minimize the risk of leaching of the noble metal.

When the noble metal is platinum, the platinum precursors form part of the following group, without this list being exhaustive: hexachloroplatinic acid, bromoplatinic acid, ammonium chloroplatinate, platinum chlorides, platinum dichlorocarbonyl dichloride, platinum chloride tetramine or dihydroxyplatinum-diamine. Organoplatinum complexes, such as platinum(II) diacetylacetonate, may also be used. The precursor used is preferably hexachloroplatinic acid.

Tin may be incorporated into the support in any suitable way, such as co-precipitation, ion exchange or impregnation, in any stage of the process for the preparation of the catalyst.

According to a first variant, it may be introduced into the support, for example during synthesis of the support or during forming of the support. Without being exhaustive, the techniques of addition before or during dissolution of the oxide precursors of the support during synthesis of the support, with or without ripening, may be suitable. Introduction may therefore be simultaneous with or subsequent to mixing of the precursors of the support. Tin may be introduced during synthesis of the support by a technique of the sol-gel type or may be added to an alumina sol. Tin may also be introduced during implementation of the support according to the techniques of the prior art for forming the support such as the procedures for forming by extrusion or by the oil-drop method.

According to a second variant, tin may be introduced onto the support, for example by impregnation of the previously formed support. Impregnation of the support with a solution containing one or more tin precursors may be carried out using excess solution or by dry impregnation. Impregnation may be carried out in the presence of species acting on the interaction between the tin precursor and the support. These species may for example be, and without being limitative, mineral acids (HCl, $HNO_3$) or organic acids (such as carboxylic or polycarboxylic acids), and organic compounds of the complexing type, as described for example in U.S. Pat. Nos. 6,872,300 and 6,291,394. Preferably, impregnation is carried out by any technique known to a person skilled in the art making it possible to obtain a homogeneous distribution of tin within the catalyst.

The tin precursors may be mineral or of the organometallic type, optionally of the water-soluble organometallic type. The tin precursor may be selected from the group formed by halogenated compounds, hydroxides, carbonates, carboxylates, sulphates, tartrates and nitrates. These forms of tin may be introduced into the medium for preparing the catalyst as they are, or generated in situ (for example by introducing tin and carboxylic acid). The precursors of the tin-based organometallic type may be for example $SnR_4$, where R represents an alkyl group, for example the butyl group, $Me_3SnCl$, $Me_2SnCl_2$, $Et_3SnCl$, $Et_2SnCl_2$, $EtSnCl_3$, $iPrSnCl_2$ and the hydroxides $Me_3SnOH$, $Me_2Sn(OH)_2$, $Et_3SnOH$, $Et_2Sn(OH)_2$, the oxides $(Bu_3Sn)_2O$, and the acetate $Bu_3SnOC(O)Me$. Preferably, the halogenated tin species, in particular chlorinated, will be used. In particular, $SnCl_2$ or $SnCl_4$ will advantageously be used.

According to a third variant, tin may also be introduced partly during synthesis or forming of the support and partly by deposition on the formed support.

Preferably, tin is introduced into the support, i.e. during synthesis of the support or during forming of the support. In the case of an alumina-based support in the form of beads prepared by the oil-drop technique, the tin precursor is introduced in the dropping suspension.

Phosphorus may be incorporated into the support in any suitable way, such as co-precipitation, ion exchange or impregnation, and in any stage of the process for the preparation of the catalyst. It may in particular be introduced according to the three variants described in the case of tin.

According to a variant, phosphorus is introduced into the support, i.e. during forming thereof, for example simultaneously with the tin.

According to another variant, phosphorus is introduced by impregnation, and particularly preferably it is introduced by impregnation at the same time as the noble metal. In this case, the impregnation solution contains the noble metal precursor and the phosphorus precursor.

The phosphorus precursors may be acids or salts, for example $H_3PO_4$, $H_3PO_3$, $H_3PO_2$, $NH_4H_2PO_4$, $(NH_4)_2HPO_4$.

The lanthanide group element may be incorporated into the support in any suitable way, such as co-precipitation, ion exchange or impregnation, and in any stage of the process for the preparation of the catalyst. It may in particular be introduced according to the three variants described in the case of tin. Preferably, it is introduced by impregnation, and particularly preferably it is introduced following introduction of the noble metal as described above.

The precursor of the lanthanide group element may be selected from the group comprising halogenated compounds, hydroxides, carbonates, carboxylates, sulphates, tartrates and nitrates. These forms of the lanthanide group element may be introduced into the medium for preparing the catalyst as they are or generated in situ (for example by introducing the lanthanide and carboxylic acid). Preferably, halogenated, in particular chlorinated, species of the lanthanide group element will be used. In the preferred case of cerium, for example cerium chloride or cerium nitrate will be used.

When other promoters are present, they may be incorporated into the support in any suitable way, such as co-precipitation, ion exchange or impregnation, and in any stage of the process for the preparation of the catalyst. They may in particular be introduced according to the three variants described in the case of tin.

When several components of the catalyst are introduced into the support, i.e. during synthesis of the support or during forming of the support, the introduction may be simultaneous or may take place separately.

After introduction of the components into the support, the protocol for the preparation of the catalysts according to the invention generally requires drying and calcination prior to deposition of the noble metal and optionally other components. Drying is generally carried out at a temperature comprised between 50° C. and 250° C., more preferably between 70° C. and 200° C., under air or under inert atmosphere. Calcination is preferably carried out at a temperature comprised between 350 and 650° C. and preferably between 400 and 600° C. and even more preferably between 450 and 550° C. The temperature rise may be regular or may include intermediate temperature plateaux, these plateaux being reached at fixed or variable rates of temperature increase. These temperature increases may therefore be identical or may differ in their rate (in degrees per minute or per hour).

When several components of the catalyst are introduced on the support formed by impregnation, introduction of the components may be simultaneous with a single impregnation solution or may take place separately with several impregnation solutions containing one or more of the components, in any order.

Any impregnation solution described in the present invention may comprise any polar solvent known to a person skilled in the art. Said polar solvent used is advantageously selected from the group comprising methanol, ethanol, water, phenol, cyclohexanol, used alone or in a mixture. Said polar solvent may also be selected advantageously from the group comprising propylene carbonate, DMSO (dimethylsulphoxide), N-methylpyrrolidone (NMP) or sulpholane, used alone or in a mixture. Preferably, a polar protic solvent is used. A list of the usual polar solvents as well as their dielectric constant may be found in the book "Solvents and Solvent Effects in Organic Chemistry", C. Reichardt, Wiley-VCH, 3rd edition, 2003, pages 472-474. Very preferably, the solvent used is water or ethanol, and particularly preferably, the solvent is water.

After each impregnation, the impregnated catalyst is generally dried to remove all or a part of the solvent introduced during impregnation, preferably at a temperature comprised between 50° C. and 250° C., more preferably between 70° C. and 200° C. Drying is preferably carried out for a time between 1 and 24 hours, preferably between 1 and 20 hours. Drying is carried out under air, or under inert atmosphere (nitrogen for example).

After drying, the catalyst is generally calcined, generally under air. The calcination temperature is generally comprised between 350 and 650° C. and preferably between 400 and 650° C. and even more preferably between 450 and 550° C. The temperature ramp may optionally contain temperature plateaux.

The calcination time is generally comprised between 0.5 hours and 16 hours, preferably between 1 hour and 5 hours.

More particularly, the catalyst according to the invention may be prepared by a preparation process comprising the following successive stages:
  a) preparing a support comprising tin, phosphorus and a noble metal,
  b) drying the precursor obtained in stage a) under a flow of a neutral gas or under a flow of a gas containing oxygen at a temperature less than 200° C., and calcining at a temperature comprised between 350 and 650° C.,
  c) impregnating the dried and calcined precursor obtained in stage b) with an impregnation solution comprising a precursor of at least one lanthanide group element,
  d) drying the precursor obtained in stage c) under a flow of a neutral gas or under a flow of a gas containing oxygen at a temperature less than 200° C., and calcining at a temperature comprised between 350 and 650° C.

It is preferable to introduce the lanthanide group element, and in particular cerium, on a solid impregnated with the noble metal, in particular platinum, previously dried and calcined. In fact, introducing the lanthanide group element after the platinum makes it possible to avoid a possible effect of leaching of the lanthanide group element during impregnation of the noble metal.

In stage a), a support is prepared comprising tin, phosphorus and a noble metal, Tin may be introduced at any moment in the preparation of the support, and preferably during forming, or by impregnation on a support already formed. Preferably, tin is introduced during forming of the support.

The same applies to phosphorus. Phosphorus may be introduced at any moment in the preparation of the support, and preferably during forming, or by impregnation on a support already formed. According to a variant, phosphorus is introduced into the support, i.e. during forming of the support, preferably with the tin compound. According to another variant, phosphorus is introduced by impregnation, and particularly preferably it is introduced by impregnation at the same time as the noble metal.

Introduction of the noble metal may advantageously be carried out by one or more impregnations in excess of solution on the support, or by one or more dry impregnations, and preferably by a single impregnation in excess of said support (preferably containing the tin compound and optionally phosphorus), using solution(s), preferably aqueous, containing the noble metal precursor and preferably the phosphorus precursor (when the support does not contain phosphorus or partly contains phosphorus).

Thus, according to a first variant, stage a) comprises the following successive stages:
  a1) preparing a support comprising tin by introducing the tin precursor during forming of the support,
  a2) impregnating the tin-containing support obtained in stage a1) with an impregnation solution comprising at least one precursor of a noble metal and a phosphorus precursor.

According to a second variant, stage a) comprises the following successive stages:
  a1') preparing a support comprising tin and phosphorus by introducing the tin precursor and the phosphorus precursor during forming of the support,
  a2') impregnating the support containing tin and phosphorus obtained in stage a1') with an impregnation solution comprising at least one precursor of a noble metal.

In stage b), the precursor obtained in stage a) is dried and calcined under the conditions described above.

In stage c), the dried and calcined precursor obtained in stage b) is impregnated with an impregnation solution comprising at least one precursor of a lanthanide group element. Introduction of the lanthanide group element may advantageously be carried out by one or more impregnations in excess of solution on the support, or preferably by one or more dry impregnations, and preferably by a single dry impregnation of said precursor, using solution(s), preferably aqueous, containing the precursor of the lanthanide group element, and preferably the cerium precursor.

In stage d), the precursor obtained in stage c) is dried and calcined under the conditions described above.

According to another variant, the catalyst according to the invention may be prepared by preparing a support comprising tin by introducing the tin precursor during forming of the support, followed by one or more impregnations in excess of solution on the support, or by one or more dry impregnations, and preferably by a single impregnation in excess of said precursor, using solution(s), preferably aqueous, containing a precursor of a noble metal, a phosphorus precursor and a precursor of a lanthanide group element and preferably a cerium precursor, alone or in a mixture, then it is dried and calcined under the conditions described above.

When the various precursors used in preparing the catalyst according to the invention do not contain halogen or contain an insufficient quantity of halogen, it may be necessary to add a halogenated compound during preparation. Any compound known to a person skilled in the art may be used and incorporated in any one of the stages in the preparation of the catalyst according to the invention. In particular, it is possible to use organic compounds such as methyl or ethyl halides, for example dichloromethane, chloroform, dichloroethane, methyl chloroform or carbon tetrachloride.

The halogen may also be added by impregnation with an aqueous solution of the corresponding acid, for example hydrochloric acid, at any moment in the preparation. A typical protocol consists of impregnating the solid so as to introduce the desired quantity of halogen. The catalyst is kept in contact with the aqueous solution for a sufficient length of time in order to deposit this quantity of halogen.

Chlorine may also be added to the catalyst according to the invention by means of an oxychlorination treatment. Such a treatment may for example be carried out between 350 and 550° C. for several hours under a flow of air containing the desired quantity of chlorine and optionally containing water.

Before use, the catalyst is subjected to a treatment under hydrogen in order to obtain an active metallic phase. The procedure for this treatment consists for example of a slow increase in temperature under a flow of hydrogen, pure or diluted, up to the maximum reduction temperature, for example comprised between 100 and 600° C., and preferably between 200 and 580° C., followed by holding at this temperature for example for 30 minutes to 6 hours. This reduction may be carried out straight away after calcination, or later, at the user's site. It is also possible to reduce the dried product directly, at the user's site.

Catalytic Reforming Process

The invention also relates to a process for the catalytic reforming of a hydrocarbon-containing feedstock in the presence of the catalyst according to the invention. The catalyst according to the invention may in fact be utilized in processes for the reforming of gasoline and the production of aromatic compounds.

The reforming processes make it possible to increase the octane number of the gasoline fractions originating from the distillation of crude oil and/or other refining processes such as for example, catalytic cracking or thermal cracking. The processes for the production of aromatics provide basic products (benzene, toluene, xylenes) which can be used in petrochemistry. These processes are additionally of interest as they contribute to the production of large quantities of hydrogen, which is indispensable for the processes of hydrogenation and hydrotreating in the refinery.

The feedstock of the reforming processes generally contains paraffinic, naphthenic and aromatic hydrocarbons containing from 5 to 12 carbon atoms per molecule. This feedstock is defined, among other things, by its density and its composition by weight. These feedstocks may have an initial boiling point comprised between 40° C. and 70° C. and a final boiling point comprised between 160° C. and 220° C. They may also be constituted by a gasoline fraction or a mixture of gasoline fractions having initial and final boiling points comprised between 40° C. and 220° C. The feedstock may thus also consist of a heavy naphtha having a boiling point comprised between 160° C. and 200° C.

Typically, the reforming catalyst is fed into a unit having been subjected beforehand to a reduction treatment as described above.

The feedstock is then introduced in the presence of hydrogen and with a hydrogen/hydrocarbons molar ratio of the feedstock generally comprised between 0.1 and 10, preferably between 1 and 8. The operating conditions for reforming are generally as follows: a temperature preferably comprised between 400° C. and 600° C., more preferably between 450° C. and 540° C., and a pressure preferably comprised between 0.1 MPa and 4 MPa and more preferably between 0.25 MPa and 3.0 MPa. All or part of the hydrogen produced may be recycled to the inlet of the reforming reactor.

EXAMPLES

Figure 1:
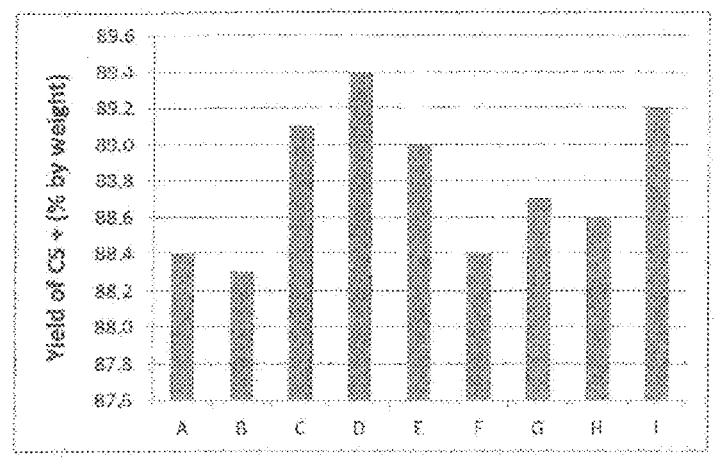
FIGS. 1-3 show the results of the tests of the catalysts produced in the Examples.

The following examples illustrate the invention.

Example 1: Preparation of a Catalyst A: Pt/Al$_2$O$_3$—Sn—P—Cl (Comparative)

A boehmite was synthesized by the alkalization of a solution of aluminium nitrate 0.1 mol·L$^{-1}$ with a sodium hydroxide solution 1 mol·L$^{-1}$ at ambient temperature and pH controlled around 10. The suspension is then ripened for one week in an oven at 95° C. without stirring. The pH of the suspension changes after ripening; the final pH is equal to 11.5. The solid is recovered by filtration and then washed in a volume of water approximately equal to the starting volume. The solid is resuspended in water and autoclaved at 150° C. for 4 h. The suspension is centrifuged and then dried under a flow of air, at ambient temperature.

The support of Example 1 is prepared using the boehmite thus synthesized. A suspension containing 25% of mineral matter (expressed in % of Al$_2$O$_3$) is prepared by mixing a feedstock of γ alumina and the boehmite powder in an acidified aqueous solution containing 15% by weight of HNO$_3$/Al$_2$O$_3$. Tin dichloride and phosphoric acid are added simultaneously to this suspension so as to obtain 0.3% by weight of tin and 0.4% by weight for the final solid. The solid fraction of Al$_2$O$_3$ is supplied at 88% by weight by the boehmite and at 12% by the feedstock of γ alumina. This suspension additionally contains a pore-forming agent and a surfactant. The pore-forming agent is an organic phase comprising a mixture of paraffins containing between 10 and 12 carbon atoms with a boiling point of approximately 290° C. and density of 0.75 g/cm$^3$. The surfactant is Galoryl. These compounds are introduced in the following proportions: weight fraction of pore-forming agent/water=1.4% and weight fraction of surfactant/pore-forming agent=6%.

The system is stirred at 600 rpm until a suspension is obtained with rheological properties suitable for dropping (viscosity 250 MPa·s).

Forming is carried out by the oil-drop method. The dropping column is fed with an ammonia solution at a concentration of 28 g/L and an organic solution constituted by the same petroleum cut as that used as pore-forming agent in the preparation of the emulsion. The suspension is dropped by means of calibrated nozzles. The beads are recovered at the bottom of the column and put in a ventilated oven at 120° C. under moist air containing 200 g of water/kg dry air for 12 h. They are then calcined under dry air at 650° C. for 3 hours. The beads obtained have a diameter of 1.9 mm.

A catalyst A is prepared on this support, aiming for the deposition of 0.3% by weight of platinum and 1% by weight of chlorine on the final catalyst. 400 cm$^3$ of an aqueous solution of hexachloroplatinic acid and hydrochloric acid is added to 100 g of alumina support containing tin. They are left in contact for 4 hours and then drained. Drying at 120° C. for 15 h is followed by calcination at 500° C. under an air flow of 100 liters per hour for 3 hours, at a rate of temperature increase of 7° C. per minute.

The chlorine content above 1% by weight after calcination is adjusted to 1% by weight by a thermal treatment of partial dechlorination at 520° C. under dry air and 8000 ppmv of water is added in the space of 2.5 hours.

Catalyst A obtained after dechlorination contains 0.29% by weight of platinum, 0.28% by weight of tin, 0.40% by weight of phosphorus and 1.01% by weight of chlorine.

Example 2: Preparation of a Catalyst B: CePt/Al$_2$O$_3$—Sn—Cl (Comparative)

The support in Example 2 is prepared in a similar way to Example 1, except that only tin dichloride is added to the boehmite suspension, aiming for 0.3% by weight of tin in the final solid.

Impregnation in excess with platinum is carried out on this support, aiming for the deposition of 0.3% by weight of platinum and 1% by weight of chlorine on the final catalyst, in the same way as described in Example 1.

After calcination, dry impregnation of cerium nitrate is carried out, aiming for 0.15% by weight on the final catalyst. Before impregnation with Ce, the catalyst is left in a water-saturated atmosphere overnight at ambient temperature. 42 cm$^3$ of an aqueous solution of cerium nitrate is added to 70 g of alumina support containing tin. They are left in contact for 30 minutes. After impregnation, the solid is again left overnight to ripen at ambient temperature in a water-saturated atmosphere. It is dried at 120° C. for 15 h and then calcined at 500° C. under an air flow of 100 liters per hour for 3 hours, at a rate of temperature increase of 7° C. per minute. The chlorine content is adjusted as described in Example 1 in the space of 2 hours.

Catalyst B obtained after dechlorination contains 0.28% by weight of platinum, 0.29% by weight of tin, 0.16% by weight of cerium and 0.99% by weight of chlorine.

Example 3: Preparation of a Catalyst C: CePt/ $Al_2O_3$—Sn—$P_{0.4}$—Cl (According to the Invention)

A catalyst C is prepared from the support in Example 1, containing 0.3% by weight of tin and 0.4% by weight of phosphorus, by impregnations with platinum and then cerium as described in Example 2.

Catalyst C obtained after dechlorination contains 0.30% by weight of platinum, 0.14% by weight of cerium, 0.28% by weight of tin, 0.39% by weight of phosphorus and 1.02% by weight of chlorine.

Example 4: Preparation of a Catalyst D: CePt/ $Al_2O_3$—Sn—$P_{0.8}$—Cl (According to the Invention)

The support in Example 4 is prepared in a similar way to Example 1, except that the phosphorus content aimed for is 0.8% by weight on the final catalyst.

Next, platinum and then cerium are impregnated as described in Example 2.

Catalyst D obtained after dechlorination contains 0.28% by weight of platinum, 0.15% by weight of cerium, 0.30% by weight of tin, 0.76% by weight of phosphorus and 1.04% by weight of chlorine.

Example 5: Preparation of a Catalyst E: PtCe/ $Al_2O_3$—Sn—$P_{0.4}$—Cl (According to the Invention)

A catalyst E is prepared from the support in Example 1, containing 0.3% by weight of tin and 0.4% by weight of phosphorus, by impregnations with cerium and then platinum, which differs from Example 2 in the order of the introduction of elements by impregnation. The contents aimed for, 0.15% by weight of cerium and 0.30% by weight of platinum, are identical.

Catalyst E obtained after dechlorination contains 0.30% by weight of platinum, 0.09% by weight of cerium, 0.29% by weight of tin, 0.39% by weight of phosphorus and 0.99% by weight of chlorine.

Example 6: Preparation of a Catalyst F: CePt/ $Al_2O_3$—Sn—$P_{0.3}$—Cl (Comparative)

The support in Example 6 is prepared in a similar way to Example 1, except that the phosphorus content aimed for is 0.3% by weight on the final catalyst.

Next, platinum and then cerium are impregnated as described in Example 2.

Catalyst F obtained after dechlorination contains 0.28% by weight of platinum, 0.16% by weight of cerium, 0.29% by weight of tin, 0.28% by weight of phosphorus and 1.01% by weight of chlorine.

Example 7: Preparation of a Catalyst G: CePt/ $Al_2O_3$—Sn—$P_{1.15}$—Cl (Comparative)

The support in Example 6 is prepared in a similar way to Example 1, except that the phosphorus content aimed for is 1.15% by weight on the final catalyst.

Next, platinum and then cerium are impregnated as described in Example 2.

Catalyst G obtained after dechlorination contains 0.28% by weight of platinum, 0.15% by weight of cerium, 0.30% by weight of tin, 1.12% by weight of phosphorus and 0.98% by weight of chlorine.

Example 8: Preparation of a Catalyst H: CePt/ $Al_2O_3$—Sn—$P_{0.4}$—Cl (Comparative)

A catalyst H is prepared from the support of Example 1, containing 0.3% by weight of tin and 0.4% by weight of phosphorus, by impregnations with platinum and then cerium as described in Example 2, except that the cerium content aimed for is 1.1% by weight.

Catalyst H obtained after dechlorination contains 0.29% by weight of platinum, 1.12% by weight of cerium, 0.31% by weight of tin, 0.38% by weight of phosphorus and 1.03% by weight of chlorine.

Example 9: Preparation of a Catalyst I: CePt$P_{0.4}$/ $Al_2O_3$—Sn—Cl (According to the Invention)

The support of Example 2 is prepared in a similar way to Example 1, except that only tin dichloride is added to the boehmite suspension, aiming for 0.3% by weight in the final solid.

Impregnation in excess with platinum is carried out according to Example 1, except that phosphoric acid is added to the solution of hexachloroplatinic acid, aiming for a content of 0.4% by weight on the final catalyst. Dry impregnation with cerium is as described in Example 2. The thermal treatments are identical to Example 2.

Catalyst I obtained after dechlorination contains 0.31% by weight of platinum, 0.14% by weight of cerium, 0.30% by weight of tin, 0.40% by weight of phosphorus and 1.00% by weight of chlorine.

Example 10: Evaluation of the Performances of Catalysts a to I in Catalytic Reforming Samples of the catalysts whose preparation is described in Examples 1 to 9 were utilized in a reaction bed suitable for the conversion of a hydrocarbon-containing feedstock, of the naphtha type originating from petroleum distillation. This naphtha has the following composition:
  49.6% by weight of paraffinic compounds,
  35.3% by weight of naphthenes,
  15.1% by weight of aromatic compounds,
for a total density of 0.7539 g/cm$^3$. The initial and final distillation points of this feedstock are 101 and 175° C., respectively, with 95% distillation carried out at 166° C. The research octane number is close to 55.

After loading in the reactor, the catalysts are activated by thermal treatment under an atmosphere of pure hydrogen, for a period of 2 h at 490° C.

The catalytic performances are evaluated under conditions of reforming reactions in the presence of hydrogen and naphtha described above. The conditions for utilizing the catalyst are as follows:

Reactor pressure: 0.76 MPa (7.6 barg)
Feed rate of 1.8 kg/h per kg of catalyst
Hydrogen/hydrocarbons molar ratio in the feedstock: 3

Comparison of the catalysts is carried out at iso quality of research octane number (RON) of the liquid effluents (reformates) resulting from the catalytic conversion of the feedstock. The comparison is carried out for a RON of 100.

The selectivity is expressed as yield of $C_{5+}$ compounds expressed as a percentage by weight with respect to the effluent at a given activity level. During the test, the yield passes through a first phase during which it increases with time under load which corresponds to deactivation of the catalyst through coking. Then, after a plateau of variable duration, the yield values decrease with time. This is the period of catalyst deactivation. Comparisons of catalysts in terms of selectivity will be carried out on the basis of the yield values measured over the plateaux. The precision for this measurement is +/−0.3 points.

The activity is expressed by the temperature required to reach a given octane number (also called RON or Research Octane Number). Here, the temperature will be taken at 24 hours of testing. The precision for this measurement is +/−2° C. Stability means the stability of the activity, which is generally measured by the thermal increment applied per unit time for maintaining a constant RON of 100.

Figure 2:
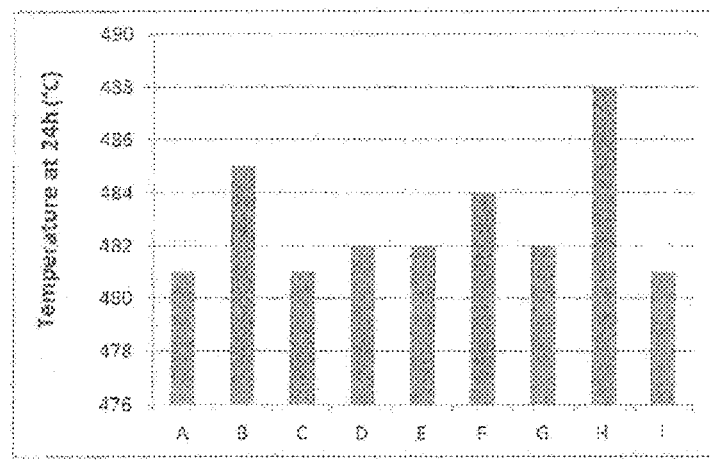
Figure 3:
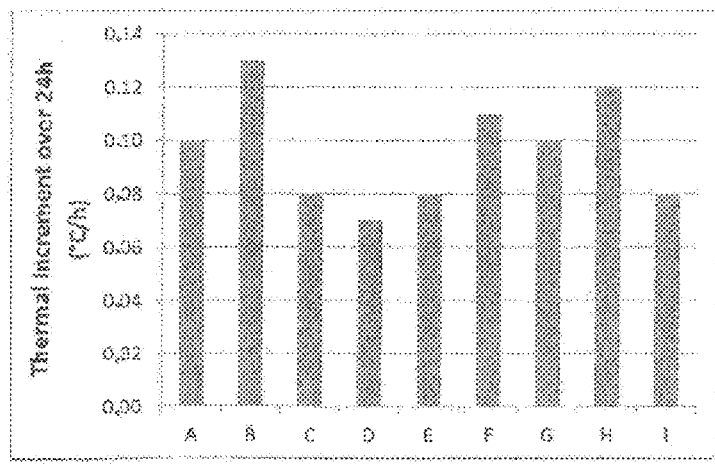

The results of the tests are shown in the table and in FIGS. 1 to 3 below. FIG. 1 shows the selectivity. FIG. 2 relates to the activity: a very active catalyst is expressed by a moderate temperature in order to reach the RON. FIG. 3 shows the stability: a stable catalyst is expressed by a small thermal increment.

| Catalyst | Yield C5+ (% by weight) | Temperature at 24 h (° C.) | Thermal increment over 240 h (° C./h) |
|---|---|---|---|
| A | 88.4 | 481 | 0.10 |
| B | 88.3 | 485 | 0.13 |
| C | 89.1 | 481 | 0.08 |
| D | 89.4 | 482 | 0.07 |
| E | 89.0 | 482 | 0.08 |
| F | 88.4 | 484 | 0.11 |
| G | 88.7 | 482 | 0.10 |
| H | 88.6 | 488 | 0.12 |
| I | 89.2 | 481 | 0.08 |

These results show a synergistic effect between P and Ce when the phosphorus content is comprised between 0.4 and 1.0% by weight of phosphorus and the cerium content is less than 1% by weight of cerium. This effect makes it possible to improve the selectivity and stability of the catalysts without degrading their activity.

The invention claimed is:

1. A catalyst comprising a support, at least one noble metal M, tin, 0.4 to 1% by weight phosphorus with respect to the weight of the catalyst and 0.01 to 0.5% by weight cerium by weight with respect to the weight of the catalyst.

2. The catalyst according to claim 1, having a content of noble metal M of 0.02 to 2% by weight with respect to the weight of the catalyst.

3. The catalyst according to claim 1, in which the metal M is platinum or palladium.

4. The catalyst according to claim 1, having a tin content of 0.005 to 10% by weight with respect to the weight of the catalyst.

5. The catalyst according to claim 1, in which the support comprises silica, alumina or silica-alumina.

6. The catalyst according to claim 1, which additionally contains a halogenated compound.

7. The catalyst according to claim 6, in which the content of halogenated compound is 0.1 to 8% by weight with respect to the weight of the catalyst.

8. A process for reforming a hydrocarbon feedstock, comprising contacting said feedstock under reforming conditions with a catalyst according to claim 1.

9. A catalyst comprising a support, at least one noble metal M, tin, phosphorus and having a content of phosphorus of 0.4 to 1% by weight, and a content of lanthanide group element(s) being less than 1% by weight with respect to the weight of the catalyst having a atomic ratio Sn/M of 0.5 to 4.0, a P/M ratio of 0.2 to 30.0, and a lanthanide(s)/M ratio of 0.1 to 5.0.

10. The catalyst according to claim 9, in which the content of lanthanide group element is 0.01 to 0.5% by weight with respect to the weight of the catalyst.

11. The catalyst according to claim 9, in which the lanthanide group element is cerium.

12. A process for the preparation of a catalyst according to claim 9, comprising the following successive stages:
a) preparing a support comprising tin, phosphorus and a noble metal,
b) drying the support obtained in stage a) under a flow of a neutral gas or under a flow of a gas containing oxygen at a temperature less than 200° C., and calcining at a temperature of 350 to 650° C.,
c) impregnating the dried and calcined support obtained in stage b) with an impregnation solution comprising a precursor of at least one lanthanide group element,
d) drying the support obtained in stage c) under a flow of a neutral gas or under a flow of a gas containing oxygen at a temperature less than 200° C., and calcining at a temperature of 350 to 650° C. to produce the catalyst.

13. The method according to claim 9, in which stage a) comprises the following stages:
a1) preparing a support comprising tin by introducing a tin precursor during forming of the support,
a2) impregnating the tin-containing support obtained in stage a1) with an impregnation solution comprising at least one precursor of a noble metal and a phosphorus precursor.

14. The method according to claim 9, in which stage a) comprises the following stages:
a1') preparing a support comprising tin and phosphorus by introducing the tin precursor and the phosphorus precursor during forming of the support,
a2') impregnating the support containing tin and phosphorus obtained in stage a1') with an impregnation solution comprising at least one precursor of a noble metal.

15. The method according to claim 9, in which the catalyst obtained after stage d) is subjected to a treatment under hydrogen.

16. A process for reforming a hydrocarbon feedstock, comprising contacting said feedstock under reforming conditions with a catalyst according to claim 9.

17. A process for the preparation of a catalyst according to claim 1, comprising the following successive stages:
a) preparing a support comprising tin, phosphorus and a noble metal, b) drying the support obtained in stage a) under a flow of a neutral gas or under a flow of a gas containing oxygen at a temperature less than 200° C., and calcining at a temperature of 350 to 650° C.,
c) impregnating the dried and calcined support obtained in stage b) with an impregnation solution comprising a precursor of cerium,
d) drying the support obtained in stage c) under a flow of a neutral gas or under a flow of a gas containing oxygen at a temperature less than 200° C., and calcining at a temperature of 350 to 650° C. to produce the catalyst.

18. The method according to claim 17, in which stage a) comprises the following stages:
   a1) preparing a support comprising tin by introducing a tin precursor during forming of the support,
   a2) impregnating the tin-containing support obtained in stage a1) with an impregnation solution comprising at least one precursor of a noble metal and a phosphorus precursor.

19. The method according to claim 17, in which stage a) comprises the following stages:
   a1') preparing a support comprising tin and phosphorus by introducing the tin precursor and the phosphorus precursor during forming of the support,
   a2') impregnating the support containing tin and phosphorus obtained in stage a1') with an impregnation solution comprising at least one precursor of a noble metal.

20. The method according to claim 17, in which the catalyst obtained after stage d) is subjected to a treatment under hydrogen.

* * * * *